US005895858A

United States Patent [19]

Malone et al.

[11] Patent Number: 5,895,858
[45] Date of Patent: Apr. 20, 1999

[54] INTEGRATED ACCELEROMETER TEST SYSTEM

[75] Inventors: Robert Malone, Westford; Brian Johnson, Upton, both of Mass.; Brian Beucler, Sandown, N.H.; Robert O'Reilly, Natick, Mass.; Normand Boucher, Lowell, Mass.; Sarkis Ourfalian, Watertown, Mass.

[73] Assignee: Analog Devices, Inc., Norwood, Mass.

[21] Appl. No.: 08/815,996

[22] Filed: Mar. 10, 1997

Related U.S. Application Data

[63] Continuation of application No. 08/466,281, May 22, 1995, abandoned.

[51] Int. Cl.$^6$ .................................................. G01P 21/00
[52] U.S. Cl. ............................. 73/1.38; 73/1.82; 73/663
[58] Field of Search .......................... 73/1 D, 1 DV, 73/663, 667, 668, 1.38, 1.82, 1.84

[56] References Cited

U.S. PATENT DOCUMENTS 5,140,844  8/1992  Derbowka ......................... 73/1 D
5,373,722  12/1994  Spies et al. ....................... 73/1 D
5,435,168  7/1995  Granere ............................. 73/663

OTHER PUBLICATIONS

R.R. Bouche et al., "Calibrators for Acceptance and Qualification Testing of Vibration Measuring Instruments," Endevco Corporation, Jan. 1964. Copy in 73/1DV.

P.M. Honnell, "Electronic Shake Table," *Electronics*, Jun. 1954, pp. 178–179.

*Primary Examiner*—John E. Chapman
*Attorney, Agent, or Firm*—Iandiorio & Teska

[57] ABSTRACT

An automatic and integrated mechanical and electrical accelerometer test system including a test fixture for holding the accelerometers to be mechanically and electrically tested; a handler subsystem for automatically feeding the accelerometers to the test fixture; a shaker subsystem for mechanically testing the accelerometers, the shaker subsystem linked to the test fixture, the shaker subsystem automatically vibrating the test fixture; and a tester for electrically testing the accelerometers while the accelerometers are vibrating.

16 Claims, 4 Drawing Sheets

INTEGRATED ACCELEROMETER TEST SYSTEM

This is a continuation of application Ser. No. 08/466,281, filed May 22, 1995, now abandoned.

FIELD OF INVENTION

An automated and integrated mechanical and electrical accelerometer test system which provides for faster, more efficient, more accurate, and more reliable testing of accelerometers since the accelerometers are actually subjected to acceleration forces during electrical testing.

BACKGROUND OF INVENTION

Accelerometers have many different designs and are used for many different purposes. A monolithic accelerometer with signal conditioning, Model No. ADXL50 available from Analog Devices, Inc., of Norwood, Mass., however, has been successfully used in the automobile industry in connection with air bags. The Model ADXL50 is designed to have an output voltage directly proportional to acceleration. The manufacturers of the air bag systems design their air bag system to inflate the air bag when the output of the Model ADX150 reaches a certain voltage level. The specification for the Analog Devices ADXL50 is available from Analog Devices, Inc., One Technology Way, P.O. Box 9106, Norwood, Mass. 02062-9106.

Since the Model ADXL50 is actually implemented in automobiles, it must be able to withstand extreme temperature ranges and, because of its purpose, it must be highly reliable. Therefore, it is essential that each accelerometer shipped from the factory be tested. The ADXL50's specifications need to be guaranteed over certain temperature ranges (−40° to 105°), and power supply conditions (+4.75 volts to +5.25 volts) for the life of the accelerometer. The specifications are as follows: zero-g (DC bias without acceleration input) output voltage, sensitivity (output voltage to input acceleration scale factor), −3 dB bandwidth, linearity, output voltage high and low, noise, self-test input logic levels and input resistance, self-test output voltage swing, power supply rejection, quiescent supply current, and operating supply voltage. The zero-g output voltage and sensitivity parameters are key product characteristics when an accelerometer is used as part of an air bag system.

In the past, before the invention of this application, three different and physically separate test systems were used to test the accelerometers. In general, electrical tests were conducted on one semi-automated test bed. After the electrical testing was completed, the accelerometers were transported to a shaker test bed where the accelerometers were tested one at a time. The accelerometers were inserted into a fixture at the top of the shaker and a synthesizer was used to drive the shaker with a 7.5 g (amplitude), 100 Hz acceleration signal. A multimeter measured the RMS amplitude of the accelerometer output and a computer calculated the accelerometer's sensitivity by comparing the test device's output to that from the shaker's reference accelerometer. The shaker test bed only tested one specification, namely, sensitivity at +25° C. and at 5 volts.

Another shaker test system was then used to mechanically test 400 devices at a time. The accelerometers were mounted on one of ten PCBs that hold up to forty devices. The loaded boards were inserted into a card cage mounted on the shaker. The top of the shaker was enclosed in a temperature chamber. Two different signals from each device (800 wires total) were routed out of the chamber to an external switch system (multiplexer). This system tested sensitivity over various temperature ranges; however, the test time was approximately eight hours for 400 accelerometers and the system was not capable of measuring the other accelerometer specification requirements.

The use of these three different and physically separate test systems raised a number of concerns. First, the test time was very slow. Second, the constant removal of the accelerometers and transporting them to the different test sites increased the likelihood of electrostatic discharge damage and lead integrity damage. Third, a special fixture was required for the electrical test bed and other special fixtures were required for the shaker test systems.

Most importantly, however, is the fact that there was no way to electrically test all of the accelerometers' specifications in a single test system under actual operating conditions, i.e., subject to acceleration forces.

SUMMARY OF INVENTION

It is therefore an object of this invention to provide an automated and integrated mechanical and electrical accelerometer test system.

It is a further object of this invention to provide such a test system which electrically tests one or more accelerometers at a time while the accelerometers are subjected to acceleration forces.

It is a further object of this invention to provide such an automated and integrated mechanical and electrical accelerometer test system which is faster, more efficient, more accurate and more reliable than the previous techniques and separate test devices used to test accelerometers.

It is a further object of this invention to provide an accelerometer test system which accurately and automatically tests an accelerometer for compliance with each specification requirement at one physical location.

It is a further object of this invention to provide such an automated and integrated mechanical and electrical accelerometer test system which has the ability to accurately measure the acceleration forces acting on the accelerometers under test.

It is a further object of this invention to provide such an automated and integrated mechanical and electrical accelerometer test system which provides self-alignment of the accelerometer test fixture and the automated handler even if the shaker physically degrades or changes position between tests.

It is a further object of this invention to provide such an automated and integrated mechanical and electrical accelerometer test system which automatically identifies an individual accelerometer being tested and automatically links any test results with that particular accelerometer thereby eliminating the need for a human operator to type in the accelerometer's serial number.

It is a further object of this invention to provide such an automated and integrated mechanical and electrical accelerometer test system which provides for parallel testing of more than one accelerometer at a time for even faster processing.

This invention results from the realization that an accelerometer can only be accurately tested if it is actually subjected to acceleration forces during electrical testing and that a faster, more efficient, more accurate, and more reliable tester for accelerometers which involves minimal human handling is accomplished by linking a modified automated electrical chip testing handler with a mechanical shaker via a specially designed test fixture so that the modified handler automatically delivers the accelerometers to the test fixture to be then shaken by the mechanical shaker thereby electrically testing the accelerometers under actual operating conditions automatically.

This invention results from the further realization that reference accelerometers are needed when standard mechanical shakers are used in order to accurately measure the acceleration forces acting on the accelerometers under test; that the very precise alignment between the specially designed test fixture and the handler must be maintained for automated processing even if the shaker physically degrades somewhat and/or changes position in between tests; that a video system can now easily be implemented as a part of the handler to identify the accelerometer being tested and also to link the test results with a particular accelerometer; and finally that parallel testing of more than one accelerometer at a time for even faster processing is now possible.

This invention features and may suitably comprise or include an automatic and integrated mechanical and electrical accelerometer test system. There are test fixture means for holding one or more accelerometers to be mechanically and electrically tested. There is a handler subsystem including means for automatically feeding one or more accelerometers to the test fixture means. There is a shaker subsystem for mechanically testing the one or more accelerometers. The shaker subsystem is linked to the test fixture means. The shaker subsystem includes means for automatically vibrating the test fixture means. There are means for electrically testing the one or more accelerometers while the one or more accelerometers are vibrating. In this way, linearity, sensitivity, zero-g bias, and noise are tested.

Further included may be reference means responsive to the test fixture means and in communication with the means for electrically testing, the reference means for establishing the magnitude of the vibrations imparted to the test fixture means by the shaker subsystem. The reference means typically includes one or more reference accelerometers affixed to the test fixture means.

There may also be means for automatically aligning the test fixture means with respect to the handler subsystem including a flag having a slot affixed to the test fixture means. An optical slot locator subsystem is mechanically isolated from the flag. The optical subsystem includes at least a first source of light and at least a first light detector responsive to the first source of light, the first source of light configured to direct light through the slot to the first sensor when the test fixture means is properly aligned with respect to the handler subsystem. A second source of light and a second light detector may be provided, the second source of light configured to direct light proximate the perimeter of the flag when the test fixture means is properly aligned with respect to the handler subsystem. There are some means for driving the shaker subsystem until the perimeter of the flag is located and then driving the shaker subsystem until the slot is located.

In a preferred embodiment, the test system further includes means for varying the temperature of the one or more accelerometers during testing. The means for varying the temperature may be integral within the handler subsystem. Further included are means for identifying the accelerometer under test. The means for identifying includes a video camera directed at a face of an accelerometer containing an indicia and further includes means responsive to the video means for digitizing the indicia. There are means for relating an individual accelerometer being tested to the test data for that accelerometer.

The handler subsystem further includes means for automatically extracting the accelerometers from the test fixture means after testing. And, the means for electrically testing the one or more accelerometers includes a database of stored accelerometer parameters and means for matching the test results of the tested accelerometers with the stored parameters.

This invention also features an automated and integrated mechanical and electrical component test system comprising: test fixture means including at least one socket for receiving a component to be electrically and mechanically tested; a handler subsystem including means for automatically feeding the component into the socket, and for removing the component from the socket after testing; a shaker subsystem for mechanically testing the component, the shaker subsystem linked to the test fixture means, the shaker subsystem including means for automatically vibrating the test fixture means once the component is in place in the socket; and means for electrically testing the one or more components while the one or more components are vibrating. Also, there may be more than one socket so that more than one component can be tested at the same time.

This invention also features an efficient and expedient method of testing accelerometers comprising: automatically feeding the accelerometers to a test fixture; vibrating the accelerometers and at the same time conducting electrical tests on the accelerometers; and automatically extracting the accelerometers from the test fixture after testing so that electrical testing occurs during mechanical testing. The temperature of the accelerometers may be varied during testing. The method further includes automatically identifying an individual accelerometer under test and automatically linking an identified accelerometer with its test results. Vibrating the accelerometers includes automatically establishing the acceleration force acting on the vibrating accelerometers.

BRIEF DESCRIPTION OF THE DRAWINGS

Other objects, features and advantages will occur to those skilled in the art from the following description of a preferred embodiment and the accompanying drawings, in which.

DESCRIPTION OF THE PREFERRED EMBODIMENT

Figure 1:
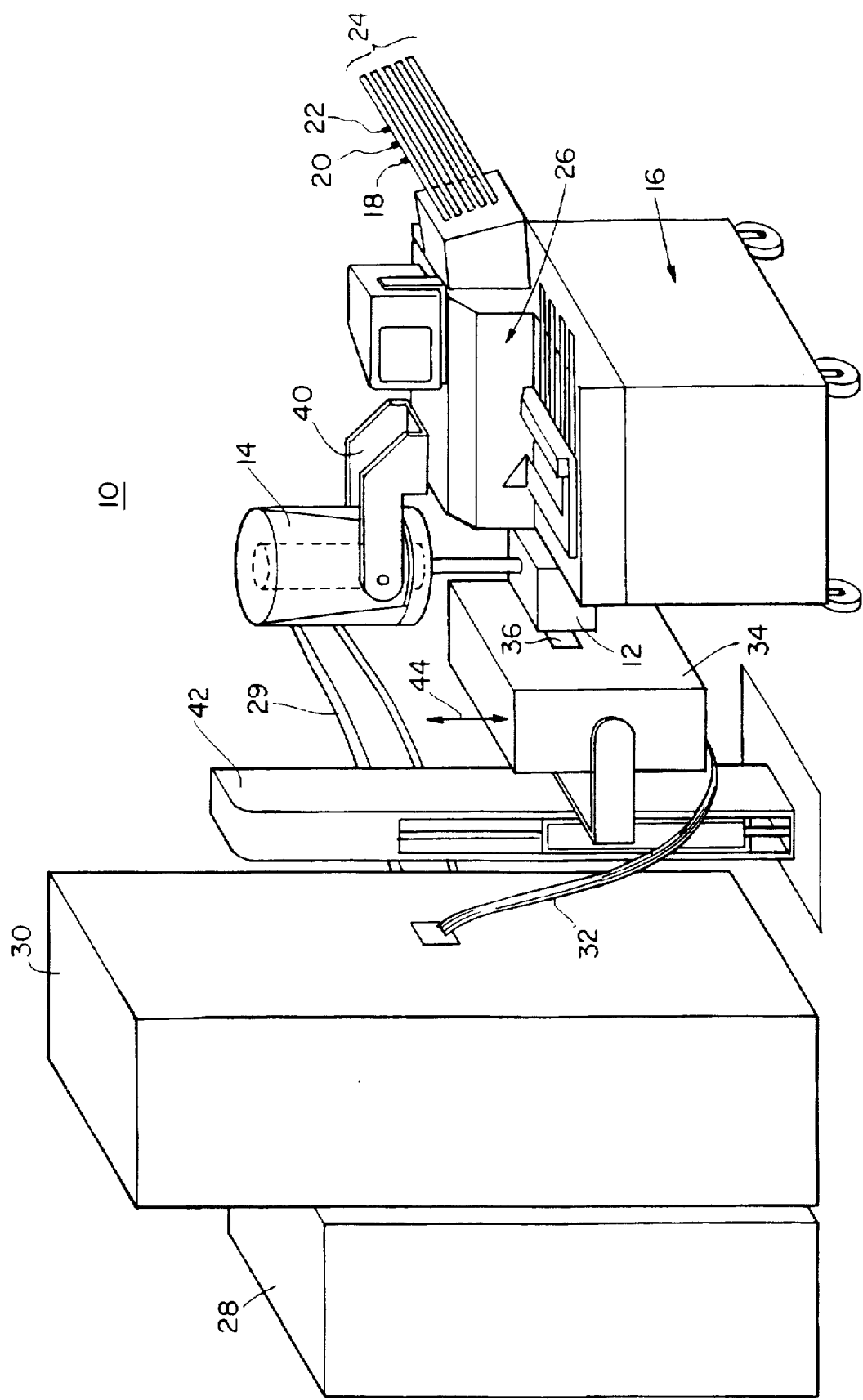
FIG. 1 is a schematic view of the automated and integrated mechanical and electrical accelerometer test system of this invention.

The automated and integrated mechanical and electrical accelerometer test system 10, FIG. 1, of this invention includes test fixture 12 which is interconnected with shaker subsystem 14 and also in communication with handler subsystem 16. Accelerometers 18, 20 and 22 loaded in tubes 24 are automatically fed by handler subsystem 16 through temperature chamber 26 and ultimately into test fixture subassembly 12. Shaker subsystem 14, energized and controlled by shaker power console 28 via cabling 29, then vibrates the accelerometer(s) under test. At the same time, tester 30 sends the appropriate electrical signals via cabling 32 to test head 34 which is electrically connected via window 36 to the accelerometer under test inside test fixture subassembly 12, as described below.

In this way, each accelerometer is electrically tested while it is vibrating to establish, among other things, whether an individual accelerometer has the appropriate output voltage based on the acceleration force acting upon it and is therefore reliable enough to be implemented within an air bag system of an automobile.

The shaker and shaker power console 28 used in this invention may be an Unholtz Dickie Corporation Model 20. Handler subsystem 16 is a modified Aseco Model S130. Shaker 14 is physically mounted on handler subsystem 16 via mount 40. Since shaker 14 is extremely heavy, special precautions need to be taken to make sure that handler subsystem 16 does not tip over.

Test head 34 is physically mounted on manipulator 42 available from the Intest Corporation so that test head 34 is maneuverable in all six degrees of freedom. In this way, test head 34 can be integrated with handlers and/or shakers having different physical characteristics.

Figure 2:
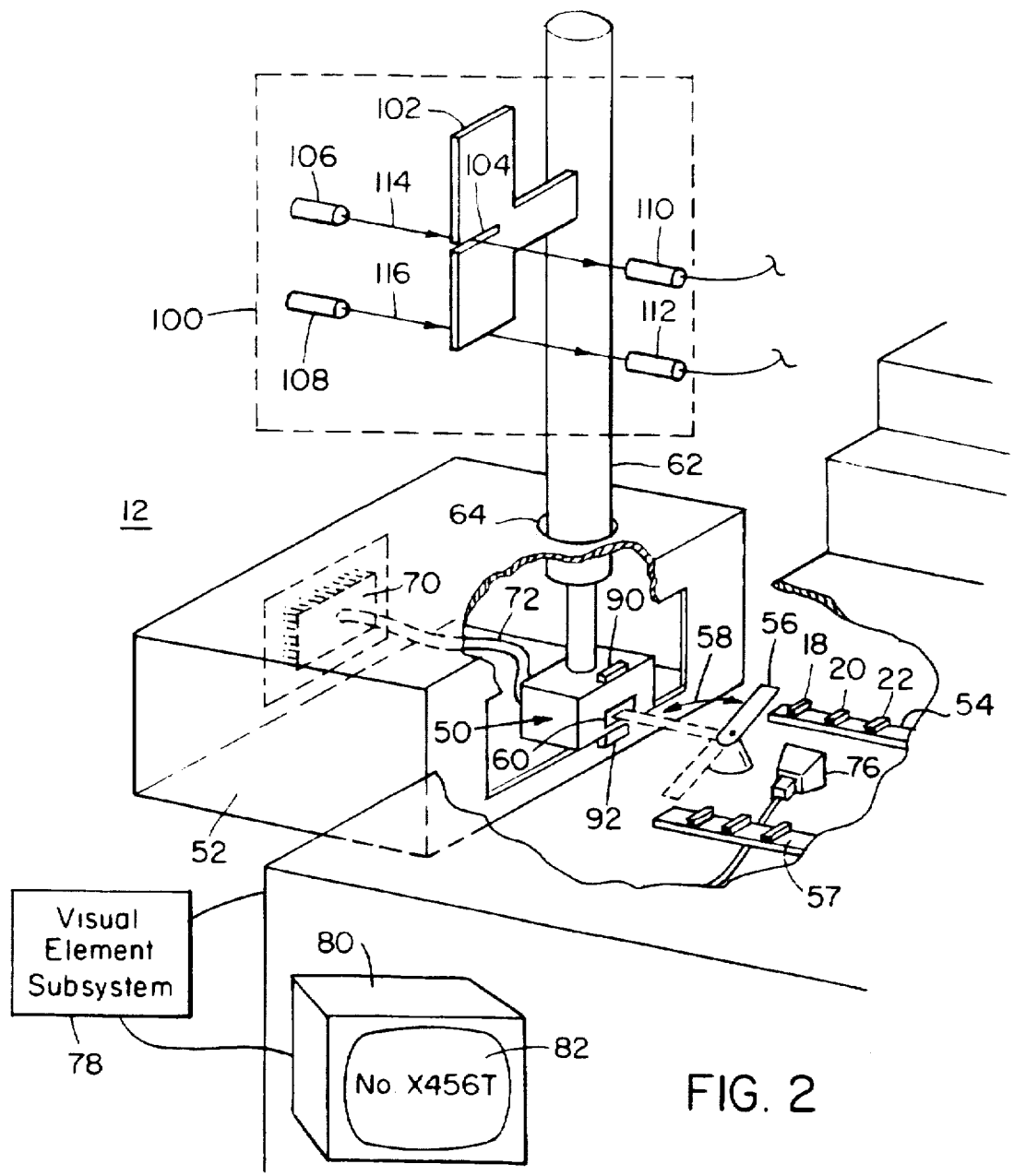
FIG. 2 is a schematic partially cutaway view of the test fixture subassembly and the automatic handler subsystem of the test system of this invention also showing the means for automatically aligning the test fixture subassembly with respect to the handler subsystem.

Test fixture subassembly 12 is shown in more detail in FIG. 2. Test site 50 is free to move within external enclosure 52 of test fixture subassembly 12. Individual accelerometers 18, 20 and 22 within handler subsystem 16 on track 54 are automatically fed via robot arm 56 operable in the direction shown by arrow 58. Robot arm 56 plugs each accelerometer into contactor 60 of test site 50 and then removes them after testing.

Test site 50 is connected via fixture 62 to shaker subsystem 14, FIG. 1, slidable through orifice 64, FIG. 2, inside enclosure 52 of test fixture assembly 12. Tester 30, FIG. 1, electrically communicates with test site 50, FIG. 2, through test head 34, FIG. 1, which is connected to interface 70, FIG. 2, inside enclosure 52. Interface 70 is interconnected with test site 50 via flexible cable 72.

Robot arm 56 retrieves each accelerometer and delivers same to device output track 57. The device travels down output track to an OCR read site where video camera 76 is used with visual electronics subsystem 78 to identify the tested device's serial number. After the serial number has been determined and test data is stored with the appropriate serial number, the device is released and delivered to the appropriate output tube of handler subsystem 16.

This automated and integrated electrical and mechanical test system processes more than 500 individual accelerometers per hour. Each accelerometer is processed one or more times. First, thermal chamber 26, FIG. 1, is set to 25° C. and the accelerometers are shaken at a 50 g amplitude at 100 Hz. The voltage signal is measured from the accelerometers and digitized so that an FFT (Fast Fourier Transform) analysis can be used to test four key test parameters: offset, sensitivity, linearity (and harmonic distortion) and noise. These test results are stored in a database operable within tester 30 for each accelerometer. And, the identification of each accelerometer is automatically paired with its appropriate test results. This is accomplished via video camera 76, FIG. 2, within handler 16. Video camera 76 is interconnected with visual electronics subsystem 78, a model 3400 available from Cognex. Monitor 80 is used to display the actual serial number 82 of an accelerometer being tested.

Next, the accelerometers are burned in at 125° C. for twenty-four hours. After burn in, these accelerometers are again processed through the automated and combined mechanical and electrical accelerometer test system 10, FIG. 1, of this invention and tested at 25°, –40° C., and 105° C.

At each temperature, all parameters are tested and a special test is also conducted to see if any of the test parameters drifted or shifted between tests.

When attempting to configure handler 16 with mechanical shaker 14 via the specially designed test fixture subassembly 12 of this invention, the inventors were faced with numerous challenges. First, shaker 14, driven by shaker power console 28, is difficult to accurately control.

Accordingly, reference accelerometers 90 and 92, FIG. 2, are physically fixed to test site 50 to very accurately measure the acceleration forces acting upon an accelerometer mounted in contactor 60. A closed loop control circuit is then used to drive shaker 14 with a particular accuracy. Reference accelerometers 90 and 92 are traceable to the National Bureau of Standards and are therefore very accurate.

Another problem encountered by the inventors was the tendency for the armature of shaker 14 to fail to return to the exact same location after each run. If test site 50 is not precisely aligned with respect to robot arm 56 of handler 16, the accelerometers cannot be properly positioned within contactor 60. Also, the inventors realized that the rubber mounts for shaker 14 may degrade over time and use thus causing a misalignment between test site 50 and robot arm 56.

Accordingly, automatic positioning system 100 is incorporated on shaker fixture 62 in order to precisely align test site 50 with respect to handler subsystem 16. Automatic positioning system 100 includes flag 102 which has slot 104 formed therein. An optical slot locator subsystem including LEDs 106 and 108 and corresponding detectors 110 and 112 are configured so that LED 106 transmits a beam of light 114 through slot 104 of flag 102 to be sensed by sensor 110 when test site 50 is correctly aligned with handler subsystem 16. LED 108 is configured to direct a beam of light 116 just below the bottom end of flag 102 to be sensed by detector 112.

If at any time detector 110 does not sense light from LED 106, this condition is indicative of a misalignment between test site 50 and handler subsystem 16. When this condition occurs, the shaker armature 62 is driven up and down by applying a plus or minus DC voltage to shaker 14, FIG. 1 until the point at which the bottom edge of flag 102 is located via LED 108 and detector 112. Then, shaker armature 62 is more slowly moved up and down until slot 104 is located via LED 106 and detector 110. The voltage required to maintain shaker armature 62 in that position is then stored and used to drive shaker 14, FIG. 1, as a bias voltage in order to correctly align fixture 50 with handler subsystem 16.

Figure 3:
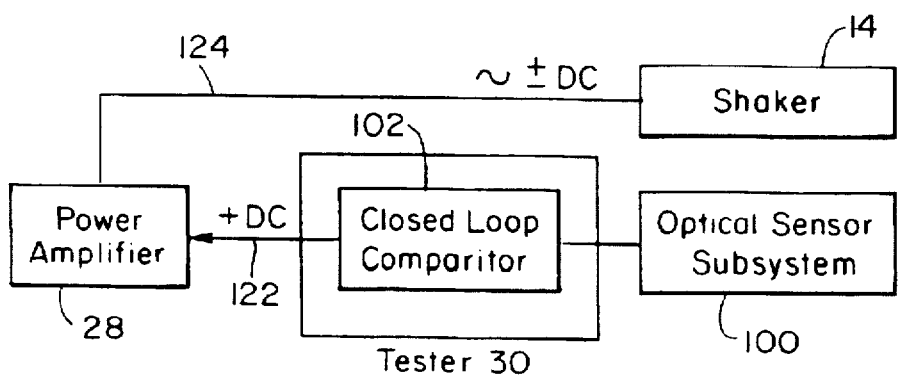
FIG. 3 is a block diagram of the primary electrical interconnections of the various subsystems of the test system of this invention.

As shown in FIG. 3, optical sensor system 100 is connected to a closed loop comparator 102 within tester 30 in order to provide the appropriate a plus or minus DC voltage to shaker 14 over line 122. A power amplifier (not shown) within shaker power console 28 powers shaker 14.

Figure 4:
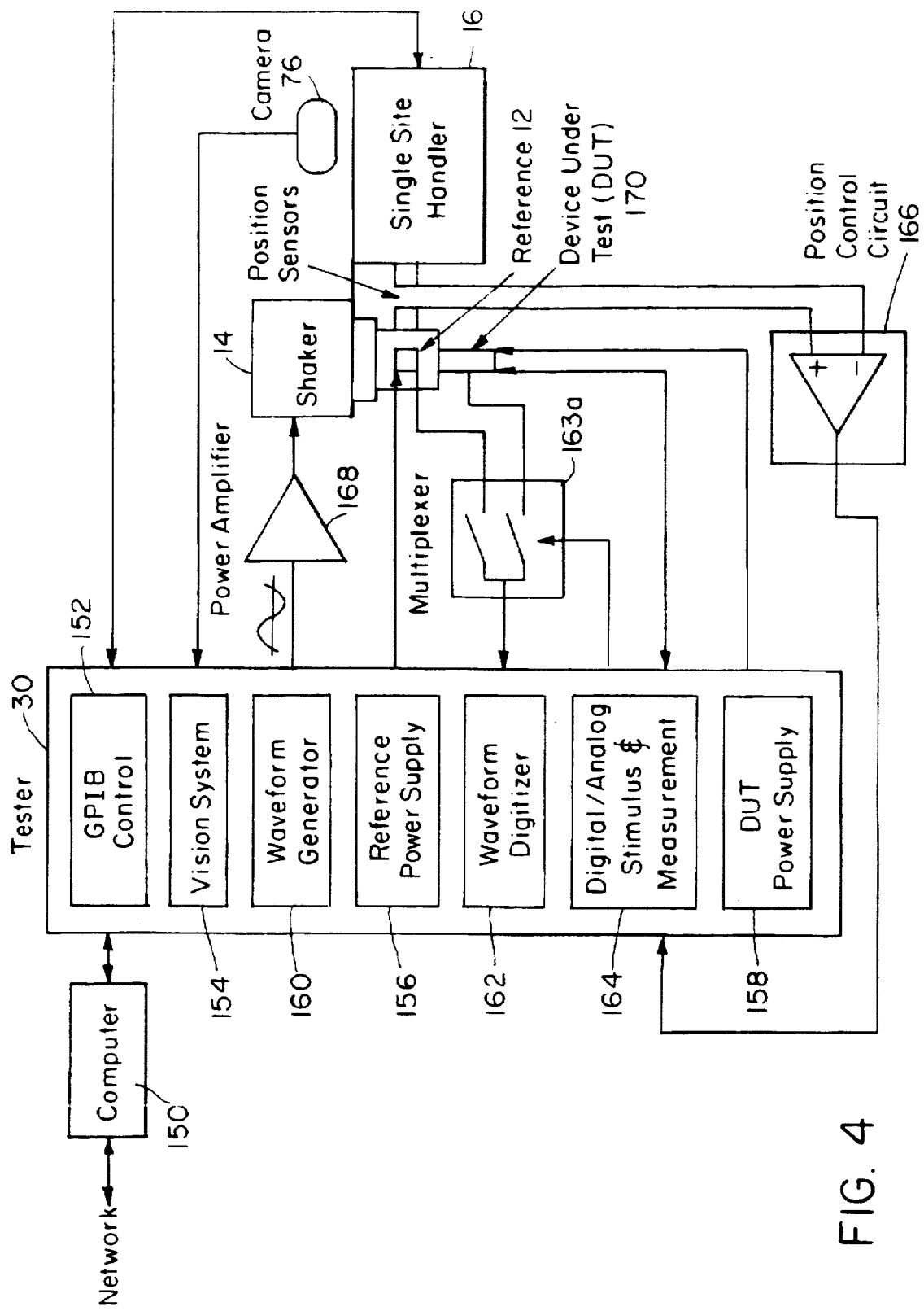
FIG. 4 is a more detailed block diagram of the various electrical hardware components implemented in the test system of this invention.

Computer 150, FIG. 4, is used to download the test program from the network to tester 30 and to upload the resulting test data for each serialized device to a central storage location. The tester's General Purpose Interface Bus (GPIB) control block 152 enables the asynchronous tester to handler communications and is the channel through which the handler 16 operation is controlled by the tester 30. The vision system 154 accepts the video input signal from the camera and converts images to serial numbers of each device tested.

The reference 156 and DUT 158 power supplies provide DC power to the reference and device(s) under test (DUT). Waveform generator 160 is used to supply the AC stimulus to the shaker through power amplifier 168 for setting the frequency and amplitude of vibration as well as the DC stimulus used to set the position of the test site relative to the handler. Waveform digitizer 162 is used to sample and convert the analog outputs of the reference and device(s) under test to digital representations for frequency domain (FFT) analysis in the tester's computer.

Digital/analog stimulus and measurement subsystem 164, responsive to multiplexer 163a enables testing of parameters that are not quantified in FFT analysis such as self-test input logic levels, self-test input resistance, self-test output voltage swing, power supply rejection, quiescent supply current and operating supply voltage. Digital outputs from this subsystem are used to select either the reference or DUT output (or one of n DUT outputs from a multi-site handler, FIG. 5) for digitization. Subsystem 164 is also used to measure the output from the position control circuit 166 to determine the location of the test site relative to the handler.

The method used to measure the accelerometer's performance requirements is as follows. An AC voltage signal at a frequency of 100 Hz is applied to power amplifier 168 by waveform generator 169. At the beginning of a test run, the output of the reference accelerometers 90, 92, FIG. 2, is measured by waveform digitizer 162, FIG. 4, and the amplitude of the signal applied to the power amplifier is adjusted based on the known (calibrated) reference accelerometer sensitivity to provide a precise 60 g (amplitude) acceleration signal to the accelerometer under test 170.

For each such device tested, the waveforms from the reference and the device(s) under test are simultaneously sampled and frequency domain (FFT) analyzed. From the FFTs: (1) the sensitivity of the device under test is determined by comparing the amplitude of the fundamental (100 Hz component) to that from the reference accelerometer; (2) the offset is determined from the amplitude of the DC component; (3) the linearity is determined from the total distortion of signal amplitudes harmonically related to the fundamental; and (4) the noise is determined from the sum total of all other signal amplitudes.

Figure 5:
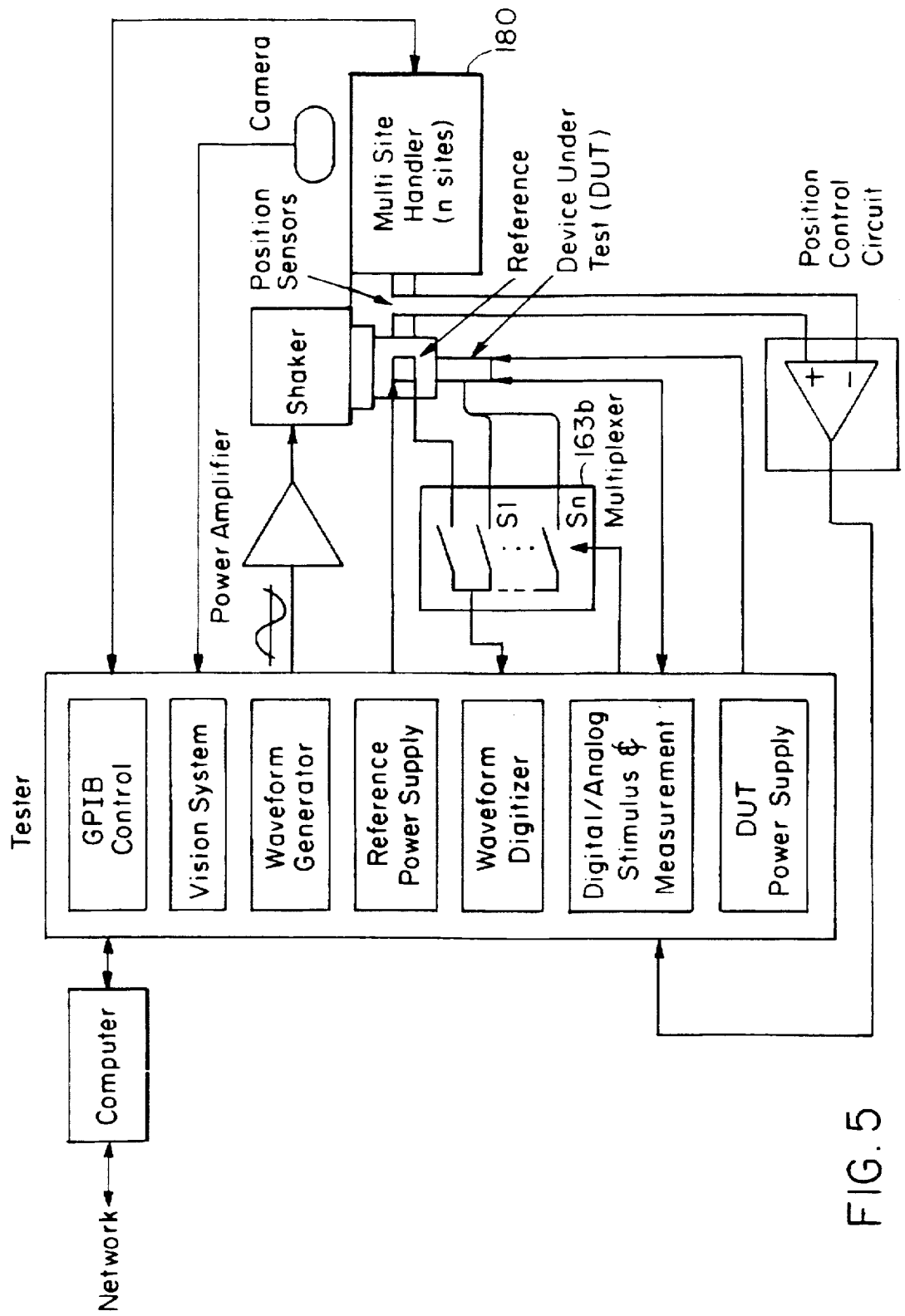
FIG. 5 is a block diagram of a particular embodiment of the test system of this invention for parallel processing.

In the multi-site embodiment, FIG. 5, there are n test sites 180 and multiplexer 163b samples the test result parameters for each device in each site under test.

Although specific features of this invention are shown in some drawings and not others, this is for convenience only as each feature may be combined with any or all of the other features in accordance with the invention. Other embodiments including test systems used for testing devices other than accelerometers will occur to those skilled in the art and are within the following claims:

What is claimed is:

1. An automatic and integrated mechanical and electrical accelerometer test system comprising:

test fixture means for holding one or more accelerometers to be mechanically and electrically tested;

a handler subsystem including means for automatically feeding said one or more accelerometers to the test fixture means;

a shaker subsystem for mechanically testing said one or more accelerometers, the shaker subsystem linked to the test fixture means, the shaker subsystem including means for automatically vibrating the test fixture means;

means for electrically testing said one or more accelerometers while said one or more accelerometers are vibrating; and means for automatically aligning said test fixture means with respect to said handler subsystem; said means for automatically aligning including a flag having a slot affixed to said test fixture means.

2. The test system of claim 1 further including an optical slot locator subsystem mechanically isolated from said flag.

3. The test system of claim 2 in which said optical slot locator subsystem includes at least a first source of light and at least a first light detector responsive to said first source of light, said first source of light oriented to direct light through said slot to said first detector when said test fixture means is properly aligned with respect to said handler subsystem.

4. The test system of claim 3 in which said optical slot locator subsystem includes a second source of light and a second light detector, said second source of light oriented to direct light proximate the perimeter of said flag when said test fixture means is properly aligned with respect to said handler subsystem.

5. The test system of claim 1 in which said means for automatically aligning said test fixture means with respect to said handler subsystem includes means for driving said shaker subsystem until the perimeter of said flag is located and then driving said shaker subsystem until said slot is located.

6. An automatic and integrated mechanical and electrical accelerometer test system comprising:

test fixture means for holding one or more accelerometers to be mechanically and electrically tested;

a handler subsystem including means for automatically feeding said one or more accelerometers to the test fixture means;

a shaker subsystem for mechanically testing said one or more accelerometers, the shaker subsystem linked to the test fixture means, the shaker subsystem including means for automatically vibrating the test fixture means;

means for electrically testing said one or more accelerometers while said one or more accelerometers are vibrating; and means for automatically identifying the accelerometer under test; said means for automatically identifying including a video camera directed at a face of an accelerometer containing an indicia.

7. The test system of claim 6 in which said means for automatically identifying further includes means responsive to said video camera for digitizing said indicia.

8. The test system of claim 6 in which said means for automatically identifying includes means for relating an individual accelerometer being tested to the test data for that accelerometer.

9. An automatic and integrated mechanical and electrical accelerometer test system comprising:

test fixture means including a contactor for holding one or more accelerometers to be mechanically and electrically tested;

a handler subsystem including means for automatically feeding said one or more accelerometers to and from the contactor of the test fixture means;

a shaker subsystem for mechanically testing said one or more accelerometers, the shaker subsystem linked to the test fixture means via a member connected to the contactor, the shaker subsystem including means for automatically vibrating the test fixture means;

means for electrically testing a plurality of specifications relating to said one or more accelerometers while said one or more accelerometers are vibrating; and means for automatically aligning said test fixture means with respect to said handler subsystem including a flag having a slot affixed to said test fixture means.

10. The test system of claim 9 further including an optical slot locator subsystem mechanically isolated from said flag.

11. The test system of claim 10 in which said optical slot locator subsystem includes at least a first source of light and at least a first light detector responsive to said first source of light, said first source of light orientated to direct light through said slot to said first detector when said test fixture means is properly aligned with respect to said handler subsystem.

12. The test system of claim 11 in which said optical slot locator subsystem includes a second source of light and a second light detector, said second source of light orientated to direct light proximate the perimeter of said flag when said test fixture means is properly aligned with respect to said handler subsystem.

13. The test system of claim 9 in which said means for automatically aligning said test fixture means with respect to said handler subsystem includes means for driving said shaker subsystem until the perimeter of said flag is located and then driving said shaker subsystem until said slot is located.

14. An automatic and integrated mechanical and electrical accelerometer test system comprising:

test fixture means including a contactor for holding one or more accelerometers to be mechanically and electrically tested;

a handler subsystem including means for automatically feeding said one or more accelerometers to and from the contactor of the test fixture means;

a shaker subsystem for mechanically testing said one or more accelerometers, the shaker subsystem linked to the test fixture means, the shaker subsystem including means for automatically vibrating the test fixture means;

means for electrically testing a plurality of specifications relating to said one or more accelerometers while said one or more accelerometers are vibrating; and means for automatically identifying the accelerometer under test including a video camera directed at a face of an accelerator under test containing an identifying indicia.

15. The test system of claim 14 in which said means for automatically identifying further includes means, responsive to said video camera, for digitizing said indicia.

16. An automated and integrated mechanical and electrical accelerometer test system comprising:

a test fixture including a test site with a contactor for receiving an accelerometer to be tested and means for electrically connecting said accelerometer to an electrical testing subsystem;

a shaker subsystem for mechanically testing said accelerometer, said shaker subsystem including a reciprocating member attached to said test fixture to vibrate said accelerometer during testing; and a handler subsystem including a robot arm for automatically feeding accelerometers into said contactor from the handler subsystem before testing and for automatically removing accelerometers from said contactor after testing;

said electrical testing subsystem including means for electrically testing a plurality of specifications of an accelerometer under test while said accelerometer is vibrated by said shaker subsystem.

\* \* \* \* \*